Sept. 10, 1974  E. DENNISON  3,834,944

MULTI-CELL METAL-FLUID BATTERY

Filed Sept. 10, 1973

Sept. 10, 1974     E. DENNISON     3,834,944

MULTI-CELL METAL-FLUID BATTERY

Filed Sept. 10, 1973     3 Sheets-Sheet 3

United States Patent Office
3,834,944
Patented Sept. 10, 1974

3,834,944
MULTI-CELL METAL-FLUID BATTERY
Edward Dennison, Waterford, Conn., assignor to
Yardney International Corp., Los Angeles, Calif.
Filed Sept. 10, 1973, Ser. No. 396,010
Int. Cl. H01m 29/04
U.S. Cl. 136—86 A    9 Claims

ABSTRACT OF THE DISCLOSURE

An improved, multi-cell metal-fluid battery comprises a container having a sidewall and endwalls defining a hollow interior within which are stacked a plurality of cells electrically connected in series, each cell containing a pair of electrodes and electrolyte activated upon contact with a fluid. Fluid flow control means are provided which distribute moisture to the electrolyte and an oxygen-containing gas to the cells to sustain the reaction in the cells. The fluid flow control means include means of separating each of the cells in the stack to provide a transverse fluid flow passageway therebetween, circulation means such as a blower activated by a motor, means spacing the stack of cells inwardly of the sidewall to define a peripheral fluid flow passageway, central openings in the cells defining a return passageway, fluid supply means and fluid cooling means such as a cooling core.

BACKGROUND OF THE INVENTION

Field of Invention

The present invention generally relates to batteries and more particularly to multi-cell metal electrodes containing fluid activated batteries.

PRIOR ART

Various types of a multi-cell series connected batteries are in use, many of which are bulky. Many of such batteries generate considerable amounts of heat during cell operation and require the use of a coolant to control cell temperatures. In some instances, the coolant is applied to the exterior of the batteries. In other instances, the coolant is contained within the battery and is circulated therein. In either case, cooling tends to be uneven and partially ineffective. There has been a need for an inexpensive uncomplicated multi-cell battery of compact size which would feature continuous efficient cooling of the cells and would permit simultaneous access to the cells of fluid necessary to sustain the cell reaction. Such battery preferably should also provide a high power output and easy assembly and removal of the cells, when exhausted, for reactivation or replacement. The battery should also be capable of operation when fully sealed and utilized in a pressurized mode.

SUMMARY OF THE INVENTION

The present invention satisfies the foregoing needs. In this regard, an improved high power multi-cell metal-fluid battery is provided. The battery can be operated utilizing circulating air or oxygen to sustain the cell reaction. This battery is as substantially described in the Abstract set forth above. The cells of the battery are series connected and arranged in a stack within the battery in a manner to provide easy access of the activating and cell sustaining fluids to the cells, both at the periphery of the cells and transversely between the individual cells.

The cells are arranged on a hollow core or spine which permits easy flow of the fluids from the cells for fluid cooling, replenishment and recirculation. Moreover, the arrangement permits easy removal of the cells after exhaustion, for their replacement or regeneration. The battery can be closed and operated in a pressurized mode for maximum efficiency. The monocell series arrangement, a single cathode being paired with each anode, yields twice the voltage within a given stack height, compared to the bicell system commonly used, which usually requires jumper connections between cells. All necessary components are containable within the battery housing, although the battery can also be operated with an external cooling system for the fluid within the battery. Further details of the present invention are set forth in the following detailed description and the accompanying drawings.

DRAWINGS

DESCRIPTION OF THE PREFERRED EMBODIMENTS

FIGS. 1–3

Figure 1:
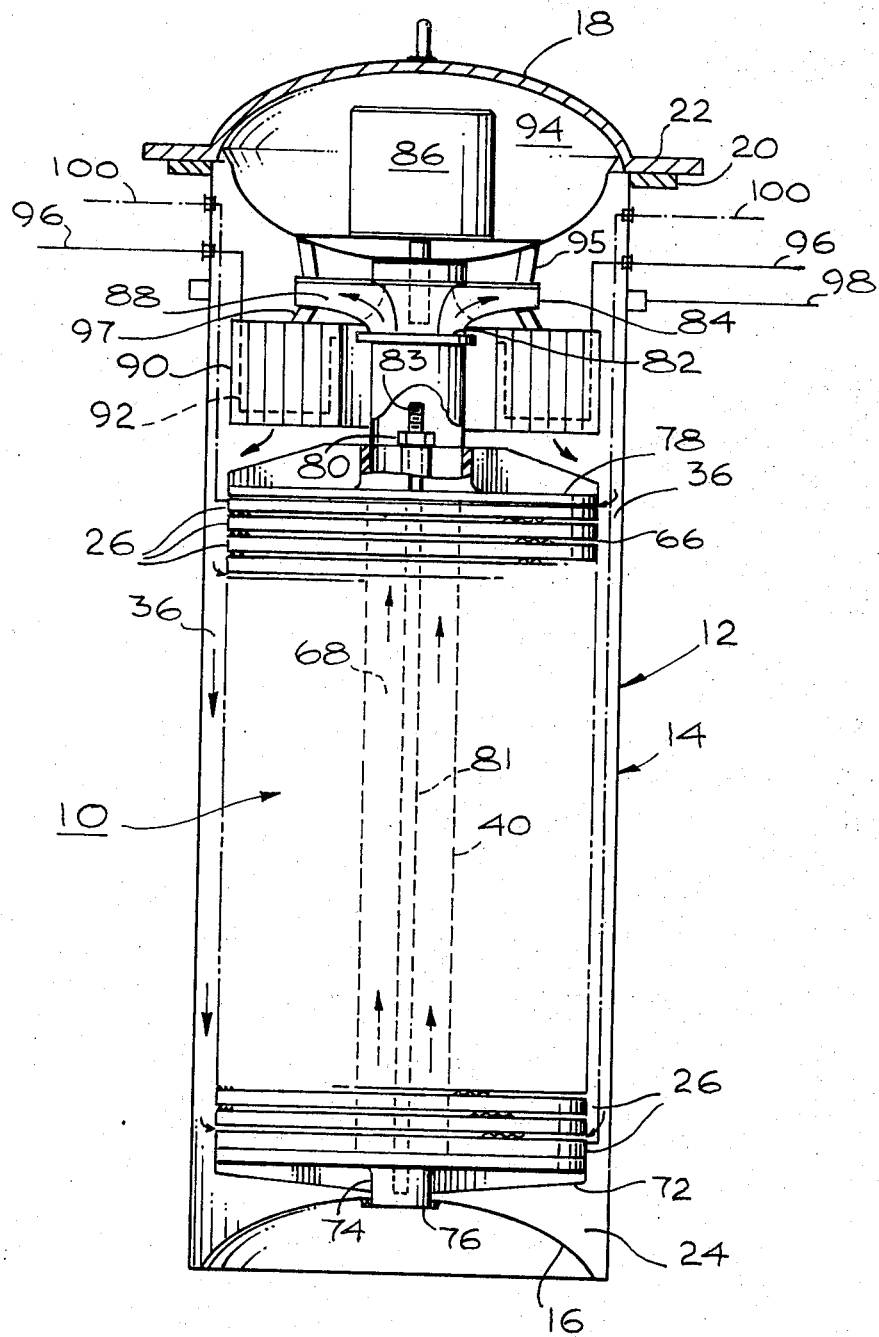
FIG. 1 is a schematic partial vertical section of a first preferred embodiment of the improved multi-cell battery of the present invention.
Figure 2:
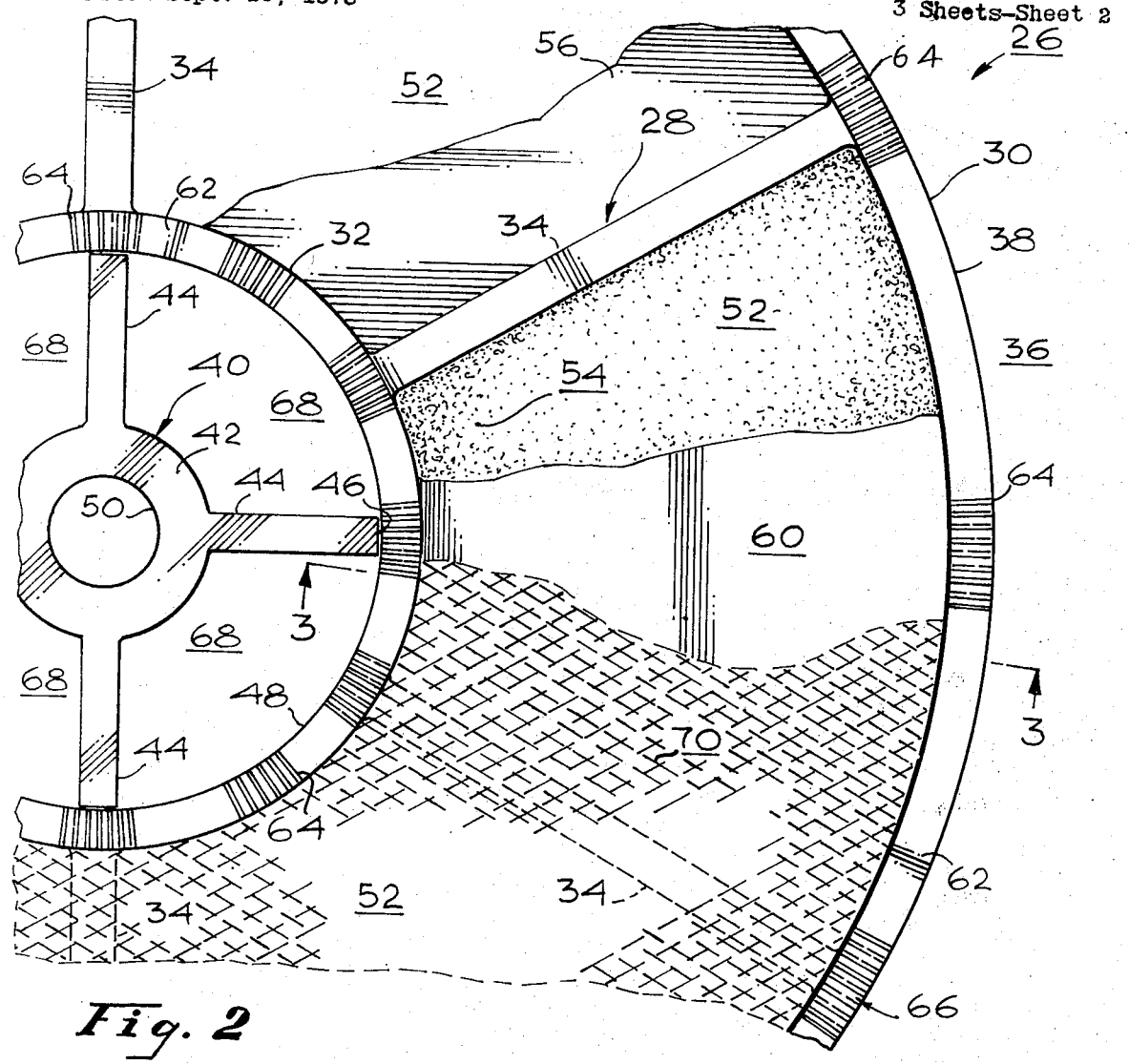
FIG. 2 is an enlarged schematic plan view of a portion of one of the cells and supporting structure of the embodiment of FIG. 1, portions being broken away to illustrate certain features.
Figure 3:
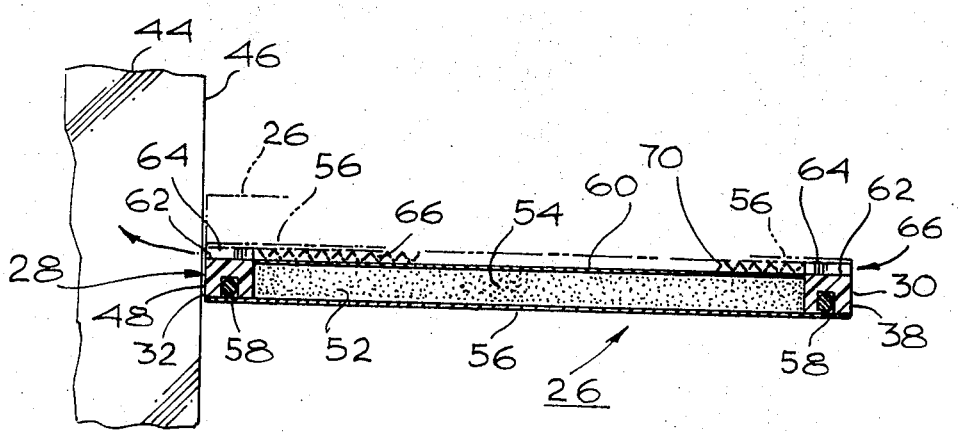
FIG. 3 is a schematic horizontal view of the cell and structure of FIG. 2, with a portion in section, taken along the section line 3—3 of FIG. 2.

Now referring particularly to the first embodiment of the present invention, an improved multi-cell metal fluid battery 10 is depicted in FIG. 1 and a portion thereof is depicted in FIGS. 2 and 3. Battery 10 comprises a hollow container 12 which includes, in the embodiment shown in FIG. 1, a substantially cylindrical sidewall 14, a bottom endwall 16 which may be separatable therefrom or integral therewith and an upwardly curved removable top cover 18. The upper end of side wall 14 is provided with an outwardly extending peripheral flange 20 upon which rests a similar flange 22 extending along the periphery of cover 18. Means are provided (not shown) to removably secure top cover 18 to sidewall 14 in the area of flanges 20 and 22, e.g., bolts, etc., so that when cover 18 is in position (as shown in FIG. 1) container 12 is sealed shut and can be pressurized.

It will be understood that container 12 and its components can have any other suitable configuration, i.e., container 12 can be of square, rectangular or an irregular shape or the like. Moreover, it can be fabricated of any suitable material such as wood, metal, plastic, synthetic resin or the like. As shown in FIG. 1, container 12 is provided with a hollow interior 24 within which are disposed a plurality of cells 26 in stack relationship, one upon another.

As shown more particularly in FIG. 2 and FIG. 3, each cell 26 is preferably of annular flat disc form. Each cell 26 comprises a frame 28 which may include an outer ring 30 and an inner ring 32 interconnected by the plurality of spaced radiating ribs or spokes 34. Frame 28 is of electrically non-conductive material, preferably of a light weight, heat resistant synthetic plastic or similar material.

Each frame 28 is positioned, as by a positioning means, within the hollow interior of the container so as to define therewith a peripheral space 36 between the sidewall 14 of the container 16 and the outer surface 38 of outer ring 30 of frame 28. The positioning means as shown particularly in FIG. 2 preferably comprises a centrally disposed spine 40 vertically aligned along the longitudinal axis of container 12 and disposed within the container. The spine 40 preferably is fabricated of light weight, electrically non-conductive durable material such as plastic or the like, and includes a central tube 42 and a plurality of spaced ribs 44 connected thereto and radiating outwardly therefrom.

The outer edge 46 of each rib 44 is adapted to abut the inner edge 48 of the inner ring 32 of each frame 28 so as to orientate the frame 28 in the stack. The central tube 42 of the spine 40 is provided with a hollow core 50 adapted to receive aligning and clamping means. It is preferred that the spine be of sufficient length so as to be able to align therewith all the cells 26 to be contained within battery 10. Accordingly, tube 42 and core 50 extends the length of the spine 40 as do the spine ribs 44.

Due to the configuration of each frame 28, namely the inner and outer rings 32 and 30, respectively, with the intermediate spokes 34, each frame 28 defines a plurality of pockets 52 within which are snugly disposed fuel slugs 54 comprising a mixture of solid electrolyte material such as potassium hydroxide, or the like, and anodic material such as zinc or other metal particles, such as aluminum. Mercury oxide and/or other cell additives may also be present in the mixture in each slug 54 as required for proper operation of each cell 26. Each slug 54 can be molded or otherwise shaped to conform to the size and shape of each pocket 52 within which it is disposed.

The fuel slugs 54 are disposed on a diaphragm 56 attached to or otherwise abutting frame 28 and sealed therewith as by an O-ring seal 58. Each diaphragm 56 extends between the inner and outer rings 32 and 30 of such frame at the bottom surface of the frame. Each diaphragm 56 may be comprised of a light, thin sheet of metal such as copper, nickel or the like. The diaphragm 56 acts as the anodic terminal of cell 26 as well as a support for the slugs 54 in the pockets 52 of the frame 28 of the cell.

A cathode mat 60 of a type normally employed with metal-air cells is disposed on the upper surface of the fuel slugs 54 and extends between the inner and outer rings of the frame 28. The cathode mat 60 can comprise, for example, separating, catalytic and water repellant layers. In this regard, the layers may be for example nylon, carbon, and Teflon respectively, backed by a light metallic screen such as expanded nickel, copper, or the like. The cathode mat 60 is attached to the frame 28 by a water-tight bond of, for example, epoxy plastic, and may be molded or otherwise manufactured integral with the frame 28.

The exposed upper faces 62 of the rings 32 and 30 are provided with intermittent projections or lands 64 of suitable heighth up to about 1/16 inch or more upon which the diaphragm of the next overlying cell 26 in the stack rests. This arrangement provides a fluid passageway 66 from the outer periphery of the ring 30 to the inner periphery of ring 32 between each pair of adjoining cells 26 in the stack. Passageway 66 is in communication with the peripheral space 36 and with the spaces 68 between ribs 44 of spine 40 so that fluid can freely circulate around and between all the cells 26 in the stack, i.e., container 12.

Passageway 66 is occupied by a porous grid 70 which comprises an open electrically conductive wire screen or sheet of expanded metal such as nickel, copper, or the like. Grid 70 makes contact with both the cathode mat 60 below the grid and the diaphragm 56 which forms the anodic terminal of the cell 26 next above in the stack. Accordingly, the cells 26 in the stack are series connected. The grid 70 permits the free flow of fluid through the transverse passageway 66 so that oxygen-containing gas or the like can freely supply each cell 26 so as to sustain the reaction occurring therein. Passageway 66 is also useful for the purpose of permitting forced circulation of oxygen or other coolant fluid to each cell 26 to regulate the temperature of the cells 26 in the stack. Passageway 66 also permits access of activating fluid, such as water or water vapor, in order to dissolve the solid electrolyte in each pocket 52 and thus initiate the cell reaction. The grid 70 aids in the cooling of each cell since its contact with the diaphragm 56 above it at a plurality of points permits easy heat transfer from the diaphragm 56 to the grid 70, which is directly in the path of flow of coolant in passageway 66.

As shown in FIGS. 1 and 2, the cells 26 are stacked vertically, one upon another on the spine 40, the bottom end of the spine being connected to a horizontally extending base support 72 disposed and centered relative to the bottom endwall 16 as by a bottom projection 74 of support 72 extending into a socket 76 in endwall 16. The spine 40 aligns the cells 26 in the stack and the stack is capped with a top plate 78 overlying the uppermost cell 26 in the stack and extending part way into spaces 68 (not shown). Plate 78 is drawn down on the stack by a nut 80 releasably secured to a bolt extending down through core 50 and, in turn, releasably secured at its lower end to base support 72. Accordingly, the stack of cells 26 is snugly but releasably secured together. Spine 40 extends up beyond plate 78 and terminates in the inlet duct 82 of a centrifugal blower 84 driven by a motor 86, all of which are contained within the upper end of container 12. Centrifugal blower 84 is secured to spine 40 and includes one or a plurality of peripherally directed exit ducts 88 which force the circulation of fluid down past a cooling core 90 disposed within container 12, and then down into the peripheral space 36 for transfer to the transverse passageways 66 between cells 26. Fluid passes out of passageways 66 and into spaces 68 and then up therein until it enters duct 82 for recirculation, as described. Accordingly, a fluid flow path is provided which freely ventilates the stack.

The cooling core 90 may include a plurality of cooling coils 92 within which a cooling medium, such as water, is circulated for indirect heat transfer of excess heat generated by the battery during its operation. When the battery is operated under full load and in a continuous mode, continuous removal of excess heat may be necessary to avoid overheating of the cells. The motor 86 operating the blower 84 should be of the nonexplosive type with non-combustible lubricant utilized therein. This motor (except for the rotor shaft) preferably is in a separate upper compartment 94 secured to cover 18 in container 12, as shown in FIG. 1 so as to eliminate any possibility of ignition of the oxygen in the fluid circulated in the battery. The rotating shaft, between motor and blower, preferably is fitted with a seal of the magnetic fluid type providing an absolute closure against leakage of oxygen. Blower 84 can be secured, as by struts 95 or the like, to compartment 94 and cooling core 90 can be secured to blower 84, as by struts 97 or the like, so that when cover 18, is lifted the assembly comprising cover, motor, blower, and cooling core can be removed as a unit.

Cooling medium inlet and exit conduits 96 are provided for the circulation of water or other cooling medium to and from the cooling core. One or more fluid conduits 98 are also provided for introduction of activating and cell reaction sustaining fluids, e.g., water vapor for the cell activation and oxygen or air to sustain cell reactions. It is desirable that container 12 be hermetically sealed. Oxygen or air can be supplied from an external source (cryogenic or the like) into the container 12 to maintain a suitable working pressure, for example 100 p.s.i.a. Electrical leads 100 from the top and bottom of the stack of cells are also provided to recover the electrical output from the battery. Electrical leads (not shown) to operate the motor 86 may also be provided.

With the described arrangement, there are certain substantial advantages obtained over conventional batteries. In this regard, each anode is paired with a single cathode so that for a given height of stacked cells, the voltage is doubled in comparison with conventional bicell arrangements wherein the anodes of the cells are shared with a common cathode. Moreover, the open mesh grid interposed between the cells provides easy fluid access to each cell for cooling purposes and for introduction of oxygen or the like to sustain the cell reaction. The grid, of course, acts as a series connector between cells in addition to its other functions. The forced air circulation system with central suction is compact and highly advantageous. It provides effective cooling throughout the entire area of each cell so that the temperature within the stack is uniform and stable, maximizing the efficiency of the cells. Moreover, the stack is very compact and the entire layout is well adapted for use in a pressurized mode.

The procedure for replacing an expended cell stack is, first, to remove the cover assembly, as noted previously, thus exposing the cell stack 10 and its electrical leads 100. After disconnecting leads 100, the stack assembly, comprising cells and spine clamped between upper and lower covers, is ready to be lifted out. This is accomplished by engaging a threaded extension 83 at the upper end of central bolt 81 with a lift tool (not shown) and lifting the stack up and out of container 12.

Reversing the procedure, a fresh stack is installed, and is ready to be activated. The expended stack is subsequently dismantled and the parts, other than the expendable materials, are made available for re-use.

An additional advantage is that battery 10 need not be activated until it is to be used. Such battery, in the unactivated state, with the cells described, has an essentially limitless shelf life. The cells may be assembled into completed stacks and held in moisture-proof packages of plastic or the like, before their activation. Such stacks can be shipped in that condition and then when needed, assembled into the container and activated. The activation technique can be readily carried out by the introduction of a measured amount of water vapor or water into the sealed container with the stack in place. It is also possible to pre-activate the cells through the use of a water-bearing component in each fuel slug which component is incorporated during manufacture of the cells. The cells are then ready for service at any time, although some loss of capacity may occur. Such water retaining material may be a gel or the like, for example, sodium carboxy methyl cellulose or water-soluble ethifene-maleic anhydride copolymer resins, guar gums and the like, which products are available commercially.

FIG. 4

Figure 4:
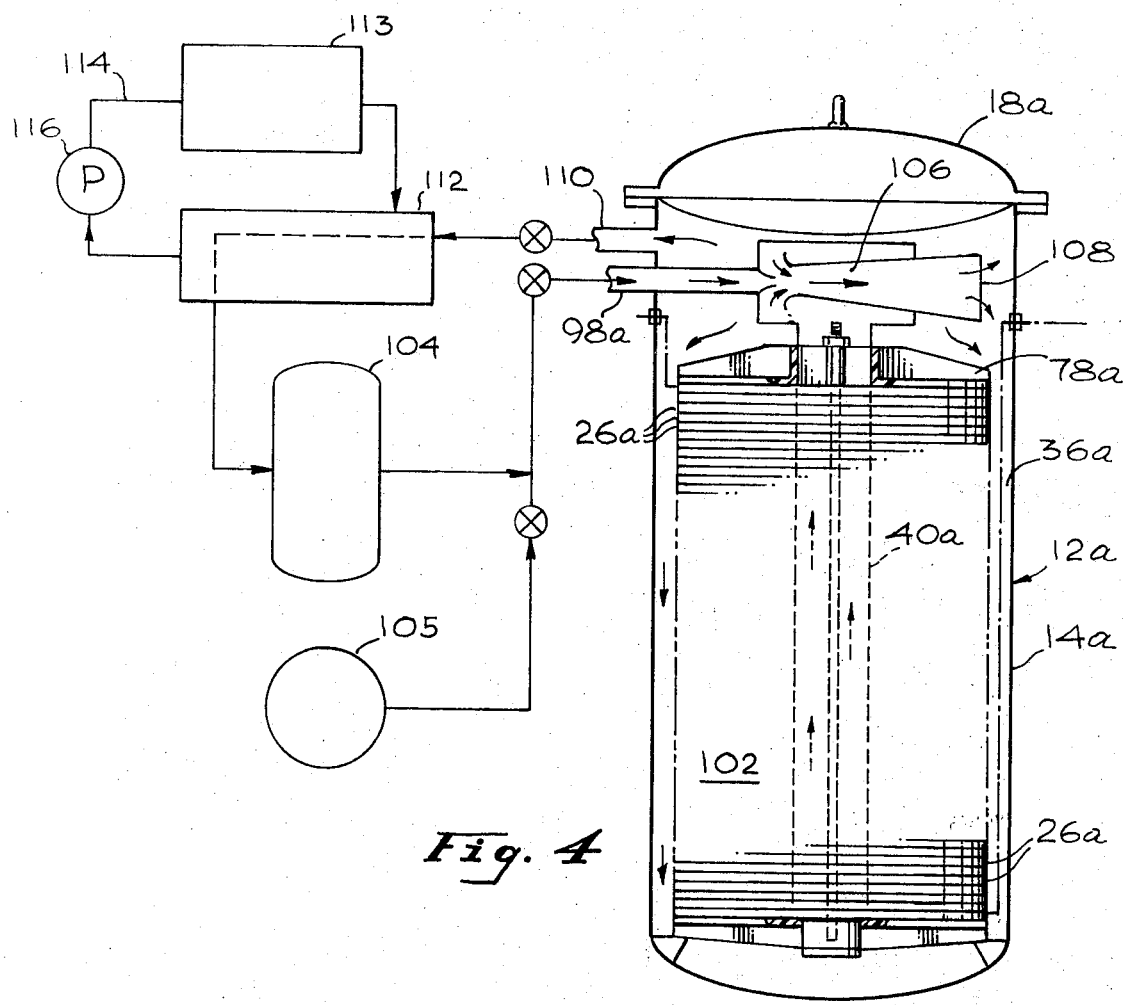
FIG. 4 is a schematic partial vertical section of a second preferred embodiment of the multi-cell battery of the present invention; and, FIG. 5 is a schematic perspective view of one embodiment of a submersible vessel, with portions broken away to show internal components, including containers housing the battery of the invention.

A second preferred embodiment of the novel battery of the present invention is set forth schematically in FIG. 4. Thus, battery 102 is depicted which is quite similar to battery 10, components substantially identical to those of battery 10 bearing the same numerals but succeeded by the letter "a."

It will be noted from FIG. 4, that battery 102 includes a container 12a, a plurality of cells 26a stacked on a central spine 40a and secured in place by a top plate 78a. Moreover, battery 102 includes a top cover 18a. However, battery 102 does not include an internally contained motor blower or cooling system.

Instead, a fluid oxygen or other fluid conduit 98a is connected through a valve system to a compressor 104 and to an oxygen (or other fluid) source 105 external of container 12a. Conduit 98a also leads into a distributor or ejector 106 disposed in the upper end of container 12a. Ejector 106 distributes oxygen or other fluid through an outlet duct 108 directly to a peripheral space 36a between the stack of cells 26a and sidewall 14a of container 12a. Transverse passages (not shown) between adjacent cells 26a permit flow of the fluid across the cells. Oxygen or other fluid returning through central spine 40a to ejector 106 is shunted to conduit 110 which exits container 12a and passes to an indirect heat exchanger 112 supplied with cooling water or the like from a primary temperature control source 113 via a line 114 and pump 116. The fluid in conduit 110 is cooled and then passed to conduit 98a after passage through compressor 104. The fluid so returned is then recycled to battery 102 as previously described. Such fluid sweeps the cells 26a in battery 102, acting as a cell coolant and as a cell reaction sustainer, since it contains oxygen.

Battery 102 provides most of the functions and advantages of battery 10 but differs in structure from battery 10 largely in providing for external cooling coils and eliminating an internally contained motor and blower. Only a portion of the circulated gas is passed through an external circuit, where it is cooled and compressed. The returning stream is made to energize an ejector or distributor, a known fluid-dynamic device for pumping a stream of gas. The result is to produce a general circulation of air or oxygen through the battery circuit.

The necessary height of the battery assembly is somewhat reduced by the configuration set forth in this embodiment, which may prove advantageous in certain applications. In addition, battery servicing is somewhat simplified. However, additional space is required for the auxiliaries.

The batteries of the present invention are especially well adapted for use in the powering of small submersible vessels and the like. When such vessels are operated on conventional batteries, the batteries are relatively large and heavy. Such batteries may be, for example, lead-acid or silver-zinc batteries and are usually in light metal boxes flooded with oil and exposed directly to sea pressure. The boxes are usually placed in a low position below the center line of the vessel. The space above the boxes is usually occupied by lighter weight components, for example, buoyant material to off-set the excess weight of the batteries. Such batteries are difficult to gain access to, yet periodic inspection and servicing are necessary.

Figure 5:
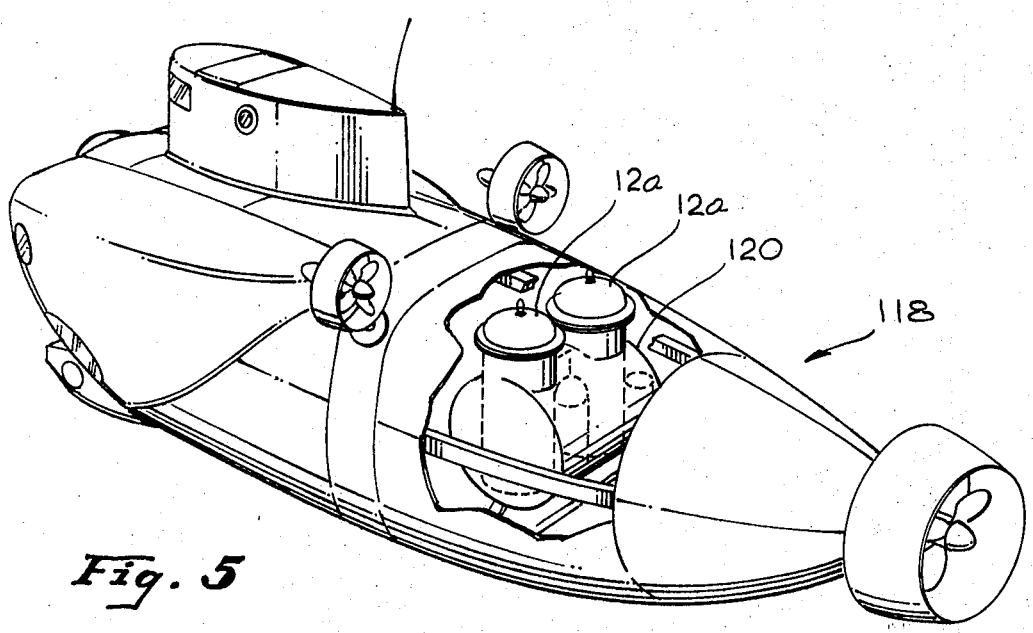

In contrast, the battery of the present invention weighs only about one-half that of conventional silver zinc batteries and is not designed for exposure to sea pressure. Instead, it is housed within the pressure hull of the vessel along with auxiliary equipment, providing a net neutral or positive buoyancy. Moreover, the battery has its center of gravity at or below the mid-heighth of the battery. In a typical application, the embodiment of FIG. 4 of the present invention is shown schematically in FIG. 5 of the drawings disposed within the hull of a submersible vessel 118. In this instance, two containers 12a of batteries 104 are releasably disposed within an outer container 120, also containing auxiliary components shown in FIG. 4 of the accompanying drawings. The cover 18a for each container 12a is accessible from the exterior of the hull 118 of the submersible vessel. Accordingly, replacement of the battery 102 and/or its cell stack 26a, repair of the battery and its inspection can easily be made. It will be understood that the embodiment of FIG. 1 can, if desired, be substituted for that of FIG. 4 for use in submersible vessels.

Oxygen can be supplied to the cell 26a (or 26) from source 105. Provision can easily be made for the removal and dissipation of parasitic heat through the heat exchanger 112 and the heat control source 113. With suitable valving, the heat thus isolated may be applied to warm the crew compartment or can be released by transferring it through the hull wall. All leads to the batteries 104 can be provided in a quick disconnect form so that the batteries can be easily freed and removed when desired.

When the battery of the present invention is compared for submersibles with the silver-zinc battery, which has largely replaced the acid-lead battery for such purposes, the battery of the invention is three times as light for a given energy capacity. Moreover, the battery of the invention has greater endurance, is less costly overall and permits continuous operation of the vessel. When the battery is compared with hydrogen-oxygen fuel cells, the battery is less hazardous, permits simpler logistics and is less costly than any known type of hydrogen-oxygen fuel cell system. Moreover, it is more efficient than any form of heat engine system and is less subject to mechanical failure, is simpler and is less costly. Mechanical replacement of the battery of the invention requires less than two hours whereas the silver-zinc battery requires ten hours of recharging time. Savings are therefore effected in use time of the vessel, crew, and support personnel.

It will be understood that various modifications can be made in the battery of the present invention, its components and parameters. All such modifications as are within the scope of the appended claims form part of the present invention.

What is claimed is:

1. An improved multi-cell, metal-fluid battery, said battery comprising, in combination:
   (a) a container having sidewalls and endwalls defining a hollow interior;
   (b) a stacked plurality of cells disposed within said container, said cells being electrically connected in series, each cell containing a pair of electrodes and an electrolyte; and,
   (c) fluid flow control means, including:
      (i) separator means between each of said cells in said stack, said separator means defining transverse fluid flow passageways between said cells;
      (ii) fluid circulating means;
      (iii) means spacing said stack of cells inwardly of said sidewalls to define therewith a passageway around the periphery of said stack;
      (iv) means comprising central openings in said cells, defining a return passageway through said stack;
      (v) fluid supply means communicating with said interior of said container; and,
      (vi) fluid flow cooling means.

2. The improved battery of Claim 1 wherein said cells are of the metal-air type.

3. The improved battery of Claim 2 wherein said cells are of the zinc-oxygen type and wherein said electrolyte before activation is of the solid alkaline-base type.

4. The improved battery of Claim 1 wherein each cell in said stack comprises an electrically non-conductive frame defining at least one pocket, a fuel slug comprising anodic and solid electrolyte material disposed within each said pocket, a diaphragm comprising a sheet of electrically conductive metal disposed against one side of said slug so as to operate as an anodic terminal, a cathode mat abutting the opposite side of said slug(s) from said side contacting said diaphragm, a spacing grid disposed on said mat and in electrical contact therewith within said pocket in said frame, the diaphragm of the next overlying cell in said stack contacting said grid and disposed on lands in the upper surfaces of said frame whereby said diaphragm and grid cooperatively define a transverse fluid flow passageway between adjacent cells in said stack.

5. The improved battery of Claim 4 wherein said frame comprises spaced concentric rings interconnected by spokes to define a plurality of said slug pockets, said frame also including a central core passageway perpendicular to the plane of said frame, said stacked plurality of cells being maintained in vertical alignment by a passageway-defining spine disposed in the aligned cores of said cells.

6. The improved battery of Claim 5 wherein each said cell is in annular disc form, wherein said spine comprises said means for aligning said stack in a position in said container to provide said peripheral fluid flow space, wherein said battery is activatable by dissolving of said solid electrolyte in moisture and wherein oxygen is utilizable therewith to maintain the reaction occurring in said cells.

7. The improved battery of Claim 6 wherein said fluid circulating means comprises a motor-operated blower disposed within said container and adjacent said stack for withdrawal of oxygen from said cores through said spine-defined passageways and for circulation of oxygen through said peripheral and transverse spaces.

8. The improved battery of Claim 7 wherein said fluid flow cooling means comprises indirect cooling coils disposed within said container in the path of flow of said fluid for removal of heat generated in said battery during operation of said cells, whereby substantially uniform temperature conditions are maintained throughout said cells in said stack.

9. The improved battery of Claim 8 wherein said battery includes a removable cover, a fluid inlet and fluid outlet, wherein said cells are circular discs, wherein said housing is generally cylindrical and closed, and wherein said stack is removably disposed above the bottom end of said housing on a base support.

References Cited

UNITED STATES PATENTS

| | | | |
|---|---|---|---|
| 3,300,344 | 1/1967 | Brag et al. | 136—86 F |
| 3,507,704 | 4/1970 | Webb | 136—86 R |
| 3,532,545 | 10/1970 | Babusci et al. | 136—36 |

ALLEN B. CURTIS, Primary Examiner